Aug. 24, 1943.  E. D. McALISTER  2,327,539
APPARATUS FOR GAS ANALYSIS
Filed Dec. 3, 1940
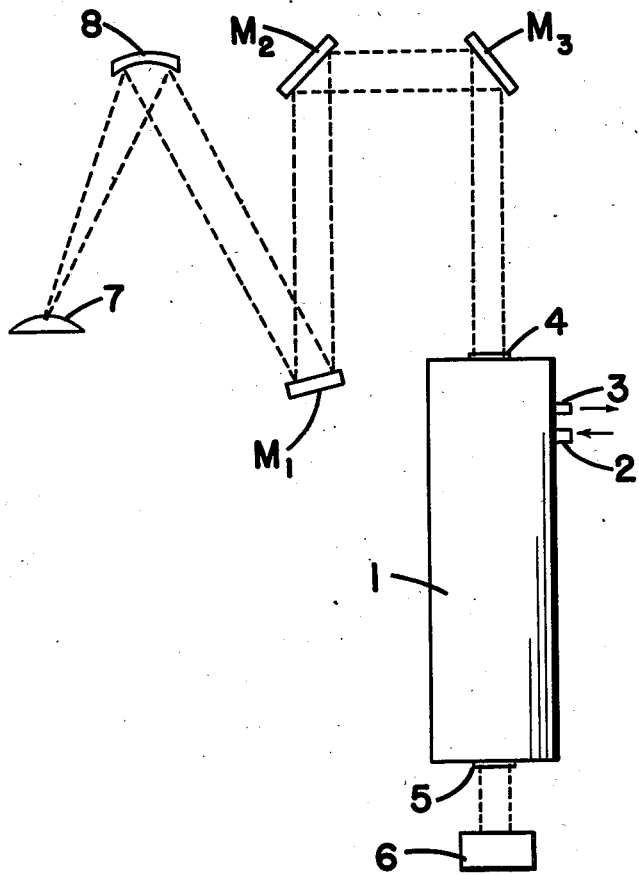
Edward D. McAlister INVENTOR.
BY P. J. Whelan Patented Aug. 24, 1943

2,327,539

UNITED STATES PATENT OFFICE 2,327,539

APPARATUS FOR GAS ANALYSIS

Edward D. McAlister, Montgomery County, Md., assignor to Standard Oil Development Company, a corporation of Delaware Application December 3, 1940, Serial No. 368,330

4 Claims. (Cl. 250—43)

The present invention relates to an apparatus for detecting and measuring minute concentrations of gases in a mixture.

It has long been recognized that various gases have the property of absorbing energy from infrared rays of various wave lengths. This property may be ascertained by placing a sample of substantially pure gas in the absorption cell of a spectroscope, such as a Littrow spectroscope, passing bands of the infrared spectrum through the gas in a path of a predetermined range, resolving the spectrum after its passage through the gas into its various wave lengths and focusing selected wave lengths on a thermocouple connected to a galvanometer. The absorptive power of the gas undergoing examination for any given wave length is indicated by the decrease in current from the thermocouple for that wave length.

It is an object of the present invention to provide an improved apparatus for detecting the presence of and for measuring the amount of various gases present in a sample.

More particularly, it is an object of the present invention to provide an apparatus in which the property of selective reflection by various materials is used to produce a narrow band of radiations which are selectively absorbed by various hydrocarbons.

Other objects and advantages of the present invention may be seen from the following description taken in conjunction with the accompanying drawing in which the sole figure is a plan view showing the path of beams of light through the apparatus.

In the drawing, numeral 1 designates an absorption cell having an inlet 2 and an outlet 3 for the sample of gas to be tested and having a slit at each end provided with suitable windows 4 and 5. In front of window 5 is a suitable detecting device 6, such as, for example, a thermocouple or a bolometer connected to a galvanometer. A source of light 7 which may, for example, be a Nernst lamp, produces radiations which fall on concave mirror 8. Rays of light from mirror 8 are focused on mirror $M_1$ where they are reflected to mirror $M_2$ and from there to mirror $M_3$ where they are directed through window 4 of cell 1 and pass through the cell and window 5 and fall on detector 6.

It may be pointed out that, while the drawing shows three mirrors designated as $M_1$, $M_2$ and $M_3$, the number of these mirrors is variable and depends on the materials used. Mirrors $M_1$, $M_2$ and $M_3$ are made of a material which selectively reflects radiation in a wave length region selectively absorbed by a gas, the constituents of which are to be quantitatively determined. This measurement is made by observing the amount of radiation absorbed by the gas, this being indicated by the decrease in deflection of galvanometer 6.

The apparatus is calibrated by knowing the amount of radiation passing through the empty cell, then inserting known amounts of the gas to be determined and noting the percentage of radiation absorbed. A sample of unknown concentration may then be inserted and its concentration determined by comparing its percentage absorption with that of the known sample.

One of the features of the present invention is that by the proper choice of materials for the mirrors $M_1$, $M_2$ and $M_3$ a band of radiation can be obtained which is absorbed by one gas only (or a few gases which absorbed radiation in the same wave length region). For example, if the mirrors are made of the mineral Scheelite ($CaWO_4$) they reflect a band of radiation from 11.5 to 12.6 microns through the absorption tube 1 which is selectively absorbed in its entirety by ethane and which is not absorbed by methane. It will thus be seen that by the use of this band of radiation ethane can be quantitatively determined when mixed with methane. The other common constituents of air, such as water vapor, carbon dioxide, oxygen and nitrogen, are relatively transparent to this aforesaid band of radiation so that ethane can be determined when in the presence of these other gases.

By the use of a narrow band of radiation which is absorbed by the gas to be detected, as above described, extremely accurate determinations may be made. For example, if a sufficiently long cell 1 is used, concentrations as low as one part of gas per million parts of mixture may be determined.

While I have specifically disclosed the use of the mineral Scheelite for reflection of the narrow band of radiation, it is obvious that other reflective materials may be used to provide for similar quantitative determination of other gases. The particularly important feature of the herein disclosed invention is the feature of using a mineral which selectively reflects only a narrow band of radiation as contrasted to the prior art in which refracting means were used to separate a source of radiation into its component parts and in which the band obtained is not as intense as is desired for obtaining accurate determinations.

It will be understood that the specific embodiment described above is merely illustrative of the present invention. Changes in various details of the apparatus are contemplated within the scope of this invention.

The nature and objects of the present invention having been thus described and illustrated, what is claimed as new and useful and is desired to be secured by Letters Patent is:

1. Apparatus for gas analysis comprising a source of radiation, an absorption cell for containing a sample of gas, said cell being provided with a plurality of slits covered with windows so placed that radiations entering the cell through one slit pass out through another slit, a plurality of mirrors of selective reflecting material placed so that they will reflect radiations from said source of radiation through the cell, each mirror being constructed of a material which selectively reflects a relatively narrow band of radiations in the infra-red range and which is selectively absorbed by a gas whose presence is suspected in the sample of gas, and a means for determining the quantity of radiation falling upon it placed to receive the radiations passing through said cell.

2. Apparatus for gas analysis comprising a source of radiation, an absorption cell for containing a sample of gas, said cell having each end provided with a slot covered with a window, a plurality of mirrors of a selectively reflecting material placed so that they will reflect radiations from said source of radiation and cause them to pass through the windows of said cell, each mirror being constructed of a material which selectively reflects a relatively narrow band of radiations in the infra-red range and which is selectively absorbed by a gas whose presence is suspected in the sample of gas, and means for determining the quantity of radiation falling upon it placed to receive radiations which have passed through the cell.

3. An apparatus according to claim 2 in which Scheelite is used as the selectively reflecting material.

4. In a gas analysis apparatus for detecting the amount of absorption of radiation by a gas sample, a reflecting means, characterized in reflecting selectively a relatively narrow band of radiations in the infra-red range, which is selectively absorbed by a gas whose presence is suspected in the gas sample to be investigated, arranged for reflecting the radiations before they are passed through the gas sample.

EDWARD D. McALISTER.